United States Patent
Kim

(10) Patent No.: US 8,253,999 B2
(45) Date of Patent: Aug. 28, 2012

(54) SCANNING APPARATUS AND METHOD OF DETERMINING QUANTITY OF REFERENCE LIGHT THEREFOR

(75) Inventor: Kyung-rok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 879 days.

(21) Appl. No.: 12/181,611

(22) Filed: Jul. 29, 2008

(65) Prior Publication Data

US 2009/0040575 A1    Feb. 12, 2009

(30) Foreign Application Priority Data

Aug. 7, 2007 (KR) .......................... 10-2007-0079139

(51) Int. Cl.
*H04N 1/04* (2006.01)
(52) U.S. Cl. ......... 358/509; 358/475; 358/1.9; 358/505; 382/162; 382/154; 399/27; 399/49
(58) Field of Classification Search .................. 358/475, 358/509, 3.27, 1.9, 406, 474, 505; 382/162, 382/167, 154; 399/27, 49, 12, 55
See application file for complete search history.

(56) References Cited

U.S. PATENT DOCUMENTS

| | | | | |
|---|---|---|---|---|
| 2,520,582 A | * | 8/1950 | Tustin | 74/574.1 |
| 4,870,454 A | * | 9/1989 | Kurusu et al. | 355/69 |
| 5,198,861 A | * | 3/1993 | Hasegawa et al. | 399/27 |
| 5,198,907 A | | 3/1993 | Walker et al. | |
| 5,809,213 A | * | 9/1998 | Bhattacharjya | 358/1.6 |
| 5,926,560 A | * | 7/1999 | Ichinose et al. | 382/162 |
| 6,404,517 B1 | * | 6/2002 | Chao | 358/504 |
| 6,982,813 B2 | * | 1/2006 | Hirata et al. | 358/1.9 |
| 7,164,805 B2 | * | 1/2007 | Takahira | 382/263 |
| 7,327,875 B2 | * | 2/2008 | Sawada | 382/162 |
| 7,436,549 B2 | * | 10/2008 | Venable et al. | 358/1.9 |
| 7,583,409 B2 | * | 9/2009 | Morgana et al. | 358/1.9 |
| 7,602,532 B2 | * | 10/2009 | Hattori | 358/3.23 |
| 7,715,047 B2 | * | 5/2010 | Momose et al. | 358/1.9 |
| 7,864,378 B2 | * | 1/2011 | Shimizu | 358/474 |
| 7,894,109 B2 | * | 2/2011 | McElvain et al. | 358/515 |
| 7,952,765 B2 | * | 5/2011 | Klassen | 358/3.26 |
| 8,072,648 B2 | * | 12/2011 | Monga et al. | 358/3.06 |
| 2005/0017998 A1 | * | 1/2005 | Han | 347/5 |
| 2005/0206928 A1 | | 9/2005 | Itagaki | |

FOREIGN PATENT DOCUMENTS

| | | |
|---|---|---|
| EP | 1622354 | 2/2006 |
| JP | 2002-55668 | 2/2002 |

OTHER PUBLICATIONS

Chinese Office Action issued in Chinese Patent Application No. 200810129295.7 on Sep. 22, 1011.
Korean Office Action issued in Korean Patent Application No. 10-2007-0079139 on Aug. 29, 2011.
European Search Report issued Dec. 6, 2011 in EP Patent Application No. 08160734.3.
Chinese Office Action Issued on May 10, 2012 in CN Patent Application No. 200810129295.7.

* cited by examiner

*Primary Examiner* — Negussie Worku

(74) *Attorney, Agent, or Firm* — Stanzione & Kim, LLP

(57) ABSTRACT

A scanning apparatus and a reference light quantity determining method includes scanning a patch that does not overlap previously established reference colors but displays each of the previously established reference colors in a plurality of regions that are spaced a portion from each other, and determining reference light quantities based on the scanning result.

15 Claims, 7 Drawing Sheets

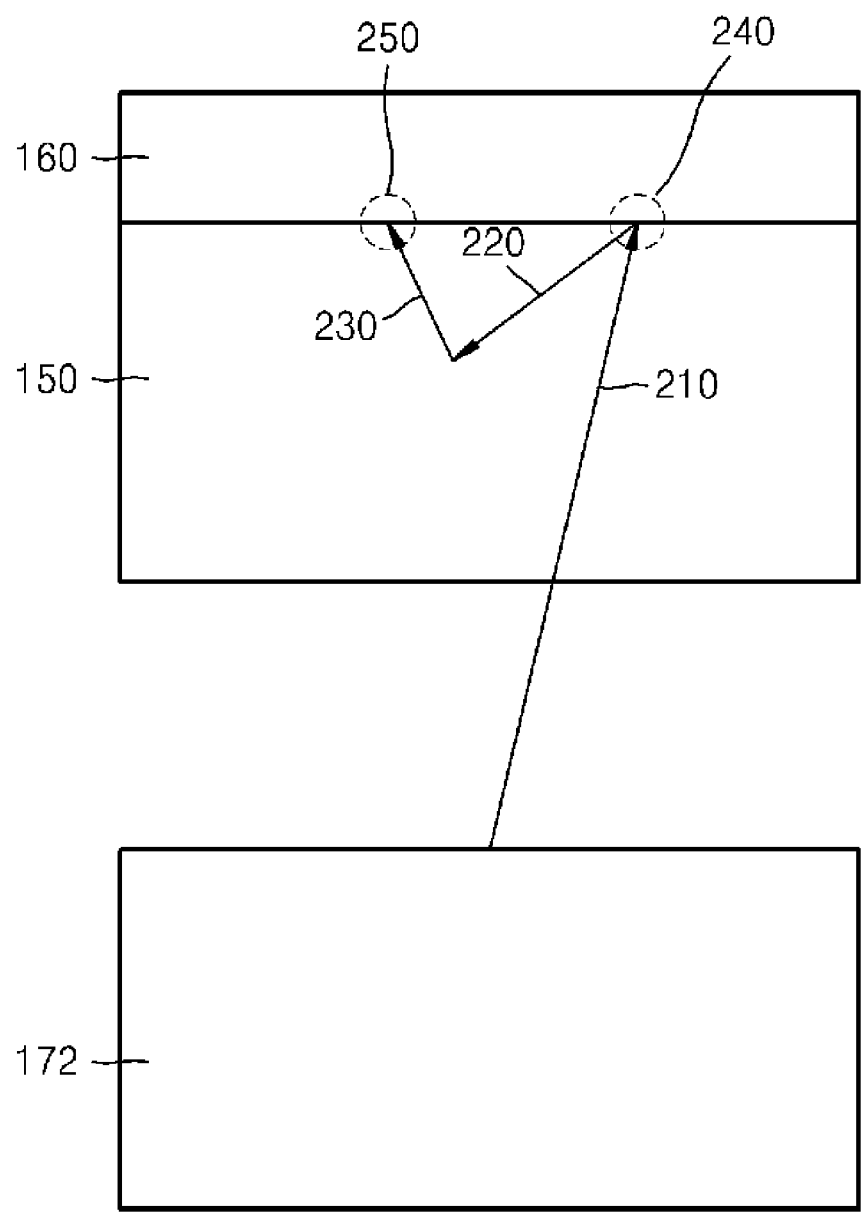

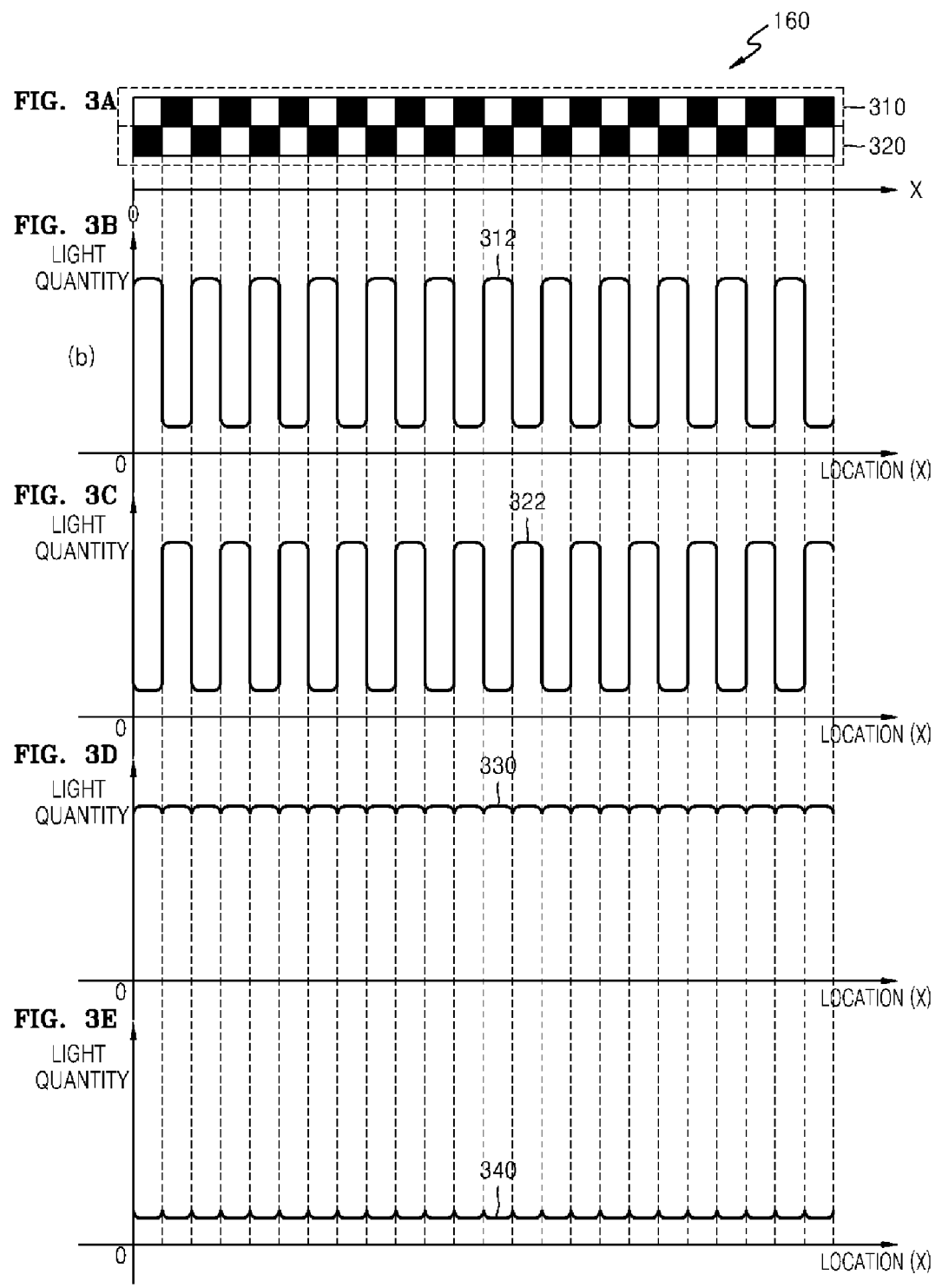

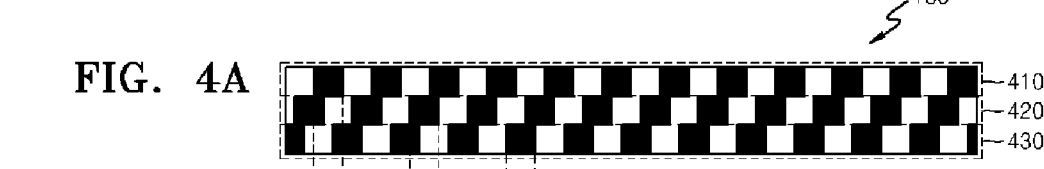
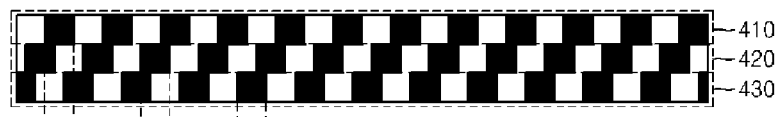
FIG. 4A
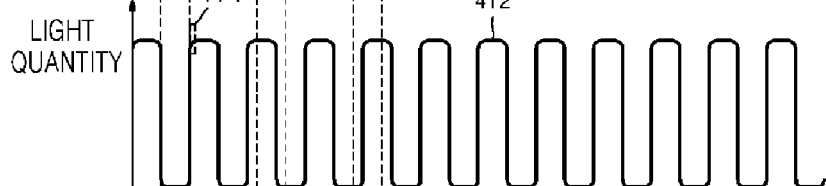
FIG. 4B
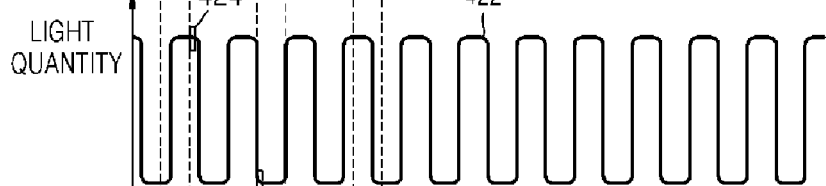
FIG. 4C
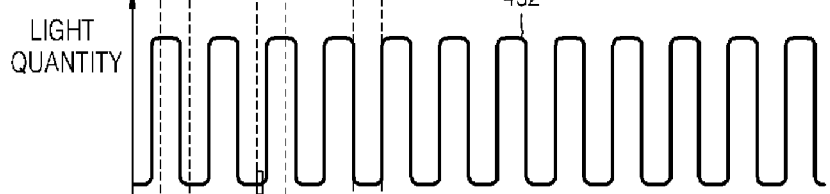
FIG. 4D
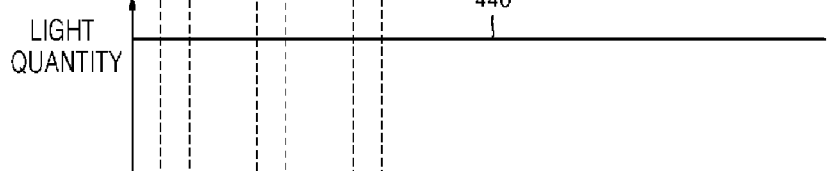
FIG. 4E
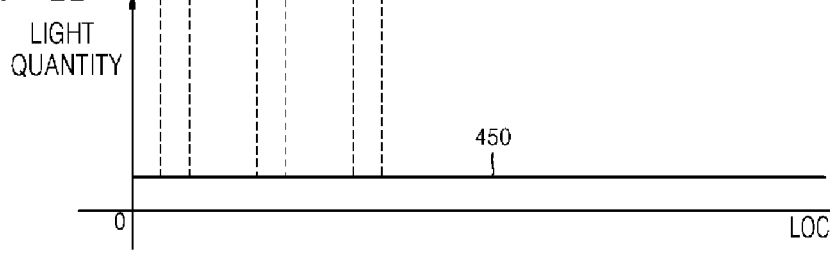
FIG. 4F

SCANNING APPARATUS AND METHOD OF DETERMINING QUANTITY OF REFERENCE LIGHT THEREFOR

CROSS-REFERENCE TO RELATED APPLICATIONS

This application claims the priority under 35 U.S.C. §119(a) from Korean Patent Application No. 10-2007-0079139, filed on Aug. 7, 2007, in the Korean Intellectual Property Office, the disclosure of which is incorporated herein in its entirety by reference.

BACKGROUND OF THE INVENTION

1. Field of the Invention

The present general inventive concept relates to scanning, and more portionicularly, to a scanning apparatus and method to determine reference light quantities by scanning a given document and identifying a scanning result based on reference light quantities that are light quantities of each of previously established reference colors.

2. Description of the Related Art

Conventional scanning devices irradiate light having a previously established light quantity at a point of a document placed on a glass plate of a scanning device, detect the light quantity of light reflected at the point of the document, compare the detected light quantity with reference light quantities, and recognize a color of the point. In this regard, reference light quantities are previously established white light quantities and previously established black light quantities. A ratio between quantity of light irradiated at a point and a quantity of light reflected at the point are determined according to a color of the point.

Conventional scanning devices, which are tightly adhered to glass plates, scan previously embedded patches and determine reference light quantities. In this regard, surfaces of patches include a single white region and a single black region, so that conventional scanning devices determine reference light quantity indicating white and reference light quantity indicating black.

In more detail, conventional scanning devices irradiate predetermined light at each point of a white region, detect the quantity of light reflected at each point, and determine a representative value (for example, a mean value) of detected quantities of light as a reference light quantity indicating white. Likewise, conventional scanning devices irradiate predetermined light at each point of a black region, detect the quantity of light reflected at each point, and determine a representative value of detected quantities of light as a reference light quantity indicating black. In this regard, light that is reflected at a point is not a portion of light irradiated at the point but a portion of light that is reflected at points adjacent to the point, reflected at a glass plate, and incident at the point. This is applied when a point and points adjacent to the point are white.

Therefore, a method of determining a reference light quantity value as a more reliable value is essentially needed.

SUMMARY OF THE INVENTION

The present general inventive concept provides a scanning apparatus to determine a value of reference light quantity as a more reliable value.

The present general inventive concept also provides an image forming apparatus to determine a value of reference light quantity as a more reliable value.

The present general inventive concept provides a method of determining a value of reference light quantity as a more reliable value.

Additional aspects and utilities of the present general inventive concept will be set forth in portion in the description which follows and, in portion, will be obvious from the description, or may be learned by practice of the general inventive concept.

The foregoing and/or other aspects and utilities of the general inventive concept may also be achieved by providing an apparatus to scan a given document including a patch including a first patch row through an $N^{th}$ patch row each including a plurality of unit patches to correct a reference light quantity, wherein the plurality of unit patches are repeatedly formed at a previously established interval and N is a natural number.

The foregoing and/or other aspects and utilities of the general inventive concept may also be achieved by providing a reference light quantity determining method used for an apparatus to scan a given document, the method including scanning a patch including a first patch row through an $N^{th}$ patch row each including a plurality of unit patches and determining reference light quantities based on the scanning result, wherein N is a natural number.

The foregoing and/or other aspects and utilities of the general inventive concept may also be achieved by providing an image forming apparatus including an apparatus to scan a given document, the apparatus including a patch including a first patch row through an $N^{th}$ patch row each including a plurality of unit patches to correct a reference light quantity, wherein the plurality of unit patches are repeatedly formed at a previously established interval and N is a natural number.

The foregoing and/or other aspects and utilities of the general inventive concept may also be achieved by providing a scanning apparatus usable with an image forming apparatus, the scanning apparatus including a patch, a light source to irradiate light on a plurality of points on a surface of the patch that does not overlap previously established reference colors, a display to display each of the previously established reference colors in a plurality of regions that are spaced a portion from each other, a sensor to detect light reflected in the plurality of points and a determining unit to determine reference light quantities based on the detected light.

The foregoing and/or other aspects and utilities of the general inventive concept may also be achieved by providing a scanning apparatus usable with an image forming apparatus, the scanning apparatus including an input unit to receive an instruction signal to determine reference light quantities for a plurality of colors of a patch, a determining unit to determine the reference light quantities for the plurality of colors of the patch at a plurality of time periods, and a light source to irradiate light and to maintain a constant quantity of the irradiated light based on the determined reference light quantity at the plurality of time periods.

The time periods may include one or more of a period of time after a power-on state is activated and a period of time when a scan operation is completed for a predetermined number of sheets of documents.

The foregoing and/or other aspects and utilities of the general inventive concept may also be achieved by providing a scanning method of an image forming apparatus, the scanning method including irradiating light on a plurality of points on a surface of the patch that does not overlap previously established reference colors, displaying each of the previously established reference colors in a plurality of regions that are spaced a portion from each other, detecting light reflected in the plurality of points, determining reference light quantities based on the detected light.

The foregoing and/or other aspects and utilities of the general inventive concept may also be achieved by providing a scanning method of an image forming apparatus, the scanning method including receiving an instruction signal to determine reference light quantities for a plurality of colors of a patch, determining the reference light quantities for the plurality of colors of the patch at a plurality of time periods, and irradiating light and to maintaining a constant quantity of the irradiated light based on the determined reference light quantity at the plurality of time periods.

The foregoing and/or other aspects and utilities of the general inventive concept may also be achieved by providing a computer-readable recording medium having embodied thereon a computer program to execute a method, wherein the method including irradiating light on a plurality of points on a surface of the patch that does not overlap previously established reference colors, displaying each of the previously established reference colors in a plurality of regions that are spaced a portion from each other, detecting light reflected in the plurality of points, and determining reference light quantities based on the detected light.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 1B is a cross-sectional view illustrating a main body of the scanning apparatus of FIG. 1A taken from a direction a;

FIG. 2 is a diagram illustrating determining a value of reference light quantity as a highly reliable value by a scanning apparatus according to an embodiment of the present general inventive concept;

FIGS. 3A-3E are diagrams illustrating a patch according to an embodiment of the present general inventive concept;

FIGS. 4A-4F are diagrams illustrating a patch according to another embodiment of the present general inventive concept;

DETAILED DESCRIPTION OF THE PREFERRED EMBODIMENTS

Figure 1A:
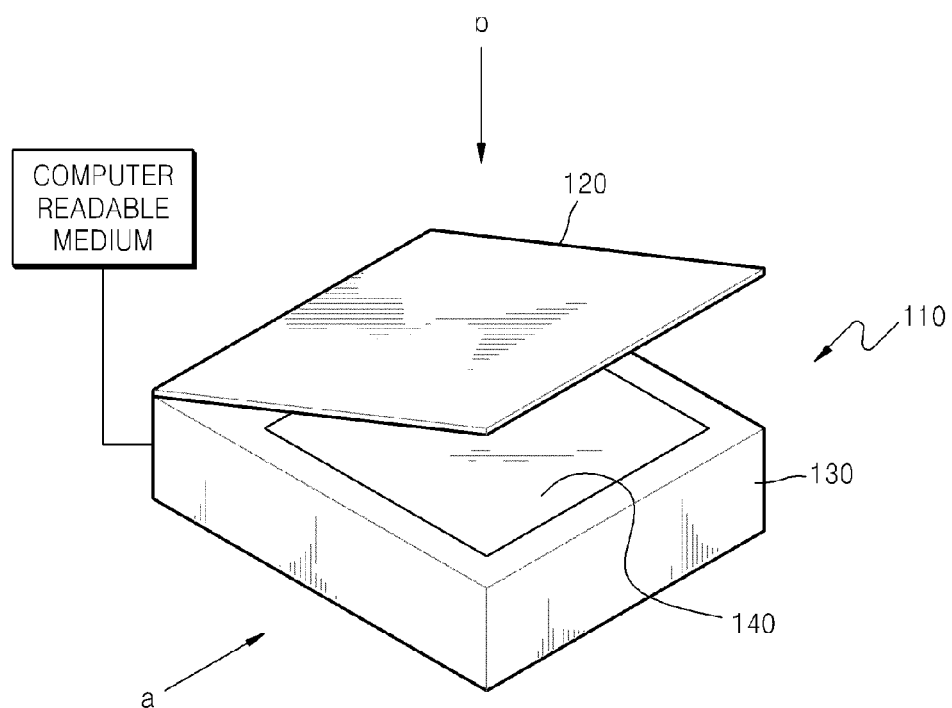
FIG. 1A is a perspective view illustrating a scanning apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1A is a perspective view illustrating a scanning apparatus 110 according to an embodiment of the present general inventive concept. Referring to FIG. 1A, the scanning apparatus 110 includes a cover 120 and a main body 130.

The scanning apparatus 110 scans a given document and determines a scanning result based on reference light quantities that are previously determined as light quantity representing each of previously established reference colors. In more detail, the scanning apparatus 110 irradiates a predetermined quantity of light at a point of a document placed on a glass surface 140 disposed on a surface of the main body 130, detects a quantity of light reflected at the point, compares the detected quantity of light with reference light quantities, and detects a color of the point. The previously established reference colors are considered as white and black for convenience of description. The scanning apparatus 110 detects the color of the point refers to the scanning apparatus 110 detects information on a color component, a luminance component, and a chrominance component of the color of the point. Meanwhile, a ratio of quantity of light irradiated at a point and quantity of light reflected at the point is determined according to a color of the point.

Figure 1B:
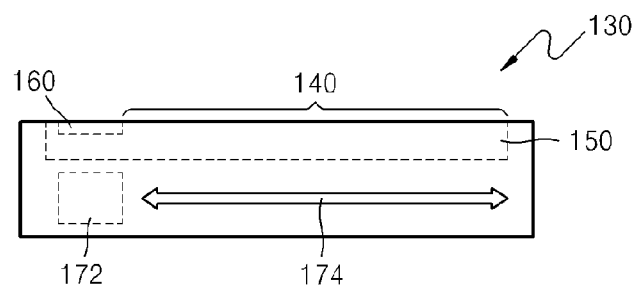
Figure 1C:
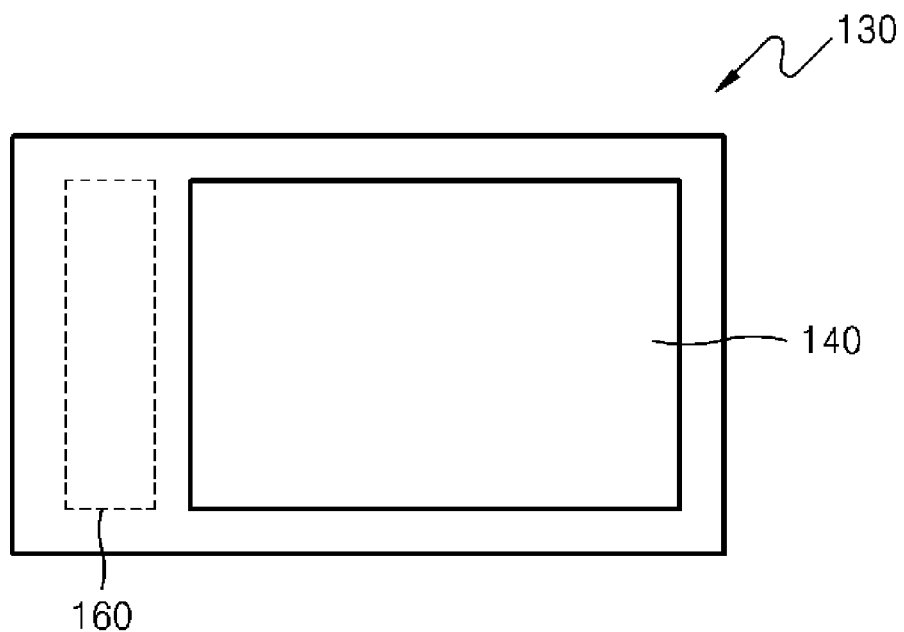
FIG. 1C is a plan view illustrating the main body of the scanning apparatus of FIG. 1A taken from a direction b.
Figure 1D:
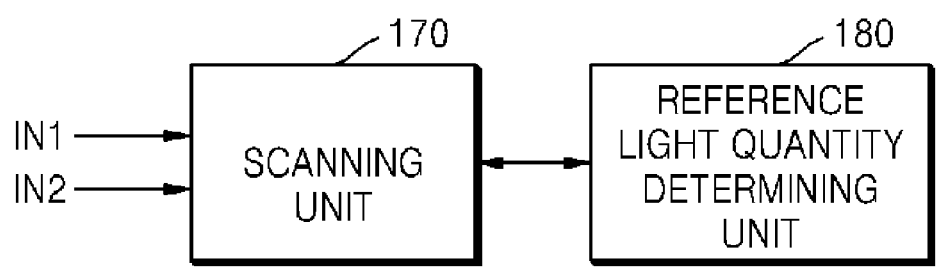
FIG. 1D is a block diagram illustrating the scanning apparatus of FIG. 1A.

FIG. 1B is a cross-sectional view illustrating a main body of the scanning apparatus of FIG. 1A taken from a direction a. FIG. 1C is a plan view illustrating the main body of the scanning apparatus of FIG. 1A taken from a direction b. FIG. 1D is a block diagram illustrating the scanning apparatus of FIG. 1A. Referring to FIGS. 1B through 1D, the main body 130 includes a glass plate 150, a patch 160, and light source 172.

The glass surface 140 that is a portion of the surface of the glass plate 150 belongs to the surface of the main body 130. The remaining surface of the glass plate 150 other than the glass surface 140 is disposed inside the main body 130.

The patch 160 is a flat member that is previously disposed inside the main body 130 and is tightly adhered to the surface of the glass plate 150. The patch 160 may be very thin, contrary to how the patch appears in FIG. 1B. The patch 160 may be formed of paper.

An image with previously established reference colors is realized on the surface of the patch 160 facing the light source 172. The image realized on the patch 160 does not overlap the previously established reference colors (for example, white and black). Each reference color includes a plurality of regions that are spaced a portion from each other.

The scanning unit 170 may operate in response to an instruction signal to determine reference light quantity that is input through an input terminal IN1, or operate in response to an instruction signal to scan a document that is input through an input terminal IN2.

The scanning unit 170 can be realized as the light source 172 and a sensor (not illustrated). If the scanning unit 170 operates, the light source 172 moves back and forth in the direction indicated by an arrow 174, and irradiates light toward the patch 160 or the glass surface 140.

In more detail, if the instruction signal to determine reference light quantity is input into the scanning unit 170, the light source 172 irradiates previously established quantity of light onto the patch 160. The sensor (not illustrated) detects the quantity of the light reflected on the patch 160. The reference light quantity determining unit 180 determines reference light quantity based on the quantity of light detected in the sensor (not illustrated). In this case, the light source 172 irradiates the previously established quantity of light onto a point on the surface of the patch 160, and the sensor (not illustrated) detects quantity of light reflected in the point. By the same principle, the sensor (not illustrated) can detect quantities of lights reflected in all points of the surface of the patch 160, and the reference light quantity determining unit 180 can determine a representative value of quantities of lights reflected in points representing the same reference color (for example, white or black) among the detected quantities of lights as a reference light quantity of the same reference color. Therefore, the reference light quantity determining unit 180 may determine reference light quantity of each reference color of the patch 160. Meanwhile, difficulties exist for the light source 172 to maintain a constant quantity of the irradiated light as time elapses. Thus, the reference light quantity determined by the reference light quantity determining unit 180 may be renewed whenever the scanning unit 170 and the reference light quantity determining unit 180 operate at a predetermined period of time. For example, a controller (not illustrated) included in the scanning apparatus 110 may generate the instruction signal to determine the reference light quantity after the scanning apparatus 110 is powered on, or whenever the scanning apparatus 110 completely scans predetermined sheets (for example, 100 sheets) of documents. The controller (not illustrated) sends all generated instruction signals to determine reference light quantity to the scanning unit 170 through the input terminal IN 1.

Alternatively, if the instruction signal to scan a document is input into the scanning unit 170, the light source 172 irradiates previously established quantity of light onto the document disposed on the glass surface 140. The sensor (not illustrated) detects the quantity of the light reflected on the document, compares the detected quantity of light with previously determined reference light quantities, and detects a color of the document. In this regard, the light source 172 irradiates the previously established quantity of light onto a point on the surface of the document, and the sensor (not illustrated) detects the quantity of light reflected in the point, compares the detected quantity of light with the previously determined reference light quantities, and detects a color of the point of the document. Meanwhile, the instruction signal to scan a document may be generated in the controller (not illustrated) when a user operates a scan instruction button (not illustrated) included in the scanning apparatus 110. The controller (not illustrated) sends all generated instruction signals to scan a document to the scanning unit 170 through the input terminal IN 2.

FIG. 2 is a diagram illustrating determining a value of reference light quantity as a highly reliable value by a scanning apparatus according to an embodiment of the present general inventive concept. FIG. 3 is a diagram illustrating the patch 160 according to an embodiment of the present general inventive concept. FIG. 4 is a diagram illustrating the patch 160 according to another embodiment of the present general inventive concept. FIG. 5 is diagram illustrating the patch 160 according to another embodiment of the present general inventive concept.

Referring to FIG. 2, if the light source 172 irradiates light onto a point 240 on the surface of the patch 160 in the direction 210, a portion of the light incident to the point 240 is reflected in the direction 220, a portion of the reflected light is reflected in the direction 230 when transmitting through the glass plate 150, and the reflected portion of the light is incident to another point 250 of the surface of the patch 160.

The reference light quantity determining unit 180 (FIG. 1D) determines the reference light quantity representing a reference color of the point 250 based on the quantity of light reflected in the point 250. In this regard, the light reflected in the point 250 is not included in the light irradiated onto the point 250 but is included in the light incident in the point 250 that is reflected in the glass plate 150 as illustrated or is reflected in the light source 172 as not illustrated in the light reflected in the point 240. This is applied to the both points 240 and 250 that are all white.

Alternatively, the patch 160 of the present embodiment does not overlap previously established reference colors but displays each of the previously established reference colors in a plurality of regions that are spaced a portion from each other. For example, the surface of the patch 160 is divided by a plurality of grids each representing one of the previously established reference colors as illustrated in FIGS. 3A and 4A. Each grid may be adjacent to another grid having a different color.

The surface of the patch 160 is not realized as an image of a single white region and a single black region like a conventional patch but as an image of a plurality of white regions and a plurality of black regions that are spaced a portion from each other as illustrated in FIGS. 3A through 5A. A possibility that the two points 240 and 250 are white is reduced compared to a conventional possibility.

The scanning apparatus of the present embodiment irradiates light onto each point of the surface of the patch 160 that does not overlap previously established reference colors but displays each of the previously established reference colors in a plurality of regions that are spaced a portion from each other (for example, the patch 160 that displays an image of the a plurality of white regions and a plurality of black regions that are spaced a portion from each other). The sensor (not illustrated) detects light reflected in each point. The reference light quantity determining unit 180 determines each value of reference light quantities representing reference colors (white and black) based on quantities of lights detected by the sensor (not illustrated), thereby determining highly reliable reference light quantities.

The patch 160 will be described in more detail with reference to FIGS. 3A-3E.

As described above, FIG. 3A illustrates an image displayed on the patch 160 of an embodiment of the present general inventive concept. In more detail, the image includes a 3-1 image 310 and a 3-2 image 320. In this case, the scanning unit 170 separately scans the 3-1 image 310 and the 3-2 image 320.

FIG. 3B illustrates the quantity of light detected by the sensor (not illustrated). A vertical axis represents the quantity of light reflected from the 3-1 image 310. An X axis represents a waveform 312 that is a location of the light reflected from the 3-1 image 310. FIG. 3C illustrates the quantity of light detected by the sensor (not illustrated). A vertical axis represents the quantity of light reflected from the 3-2 image 320. An X axis represents a waveform 322 that is a location of the light reflected from the 3-2 image 320. Referring to FIGS. 3B and 3C, the quantity of light detected by the sensor (not illustrated) alternatively includes relatively high regions and relatively low regions. The quantity of light detected by the sensor (not illustrated) having relatively high regions is quantity of light reflected in a white region. The quantity of light detected by the sensor (not illustrated) having relatively low regions represents quantity of light reflected in a black region.

Referring to FIGS. 3B and 3C, the quantities of light reflected in a white region differs according to whether the light is reflected in a portion (for example, a center portion) other than a boundary of the white region or the light is reflected in a boundary of the white region. Likewise, the quantities of light reflected in a black region differs according to whether the light is reflected in a portion (for example, a center portion) other than a boundary of the black region or the light is reflected in a boundary of the black region.

The waveforms 312 and 322 cannot be rectangular pulse waveforms since the light reflected in the patch 160 is somewhat diffracted and reaches the sensor (not illustrated), and is incident to the sensor (not illustrated), passes through a lens of the sensor (not illustrated), and somewhat spreads.

Referring to FIG. 3D, a waveform 330 represents the quantity of light that is not the smaller of the quantity of light illustrated in FIG. 3B and the quantity of light illustrated in FIG. 3C in each of locations on an X axis. In more detail, the waveform 330 represents quantity of light reflected in a white region of the patch 160 in a vertical axis, and a location of the light reflected in the white region of the patch 160 in the X axis.

Referring to FIG. 3D, a waveform 340 represents the quantity of light that is not the bigger of the quantity of light illustrated in FIG. 3B and the quantity of light illustrated in FIG. 3C in each location on an X axis. In more detail, the waveform 340 represents the quantity of light reflected in a black region of the patch 160 in a vertical axis, and a location of the light reflected in the black region of the patch 160 in the X axis.

Referring to FIGS. 3D and 3E, although the quantities of lights are reflected in a region having the same color, the quantities of lights detected by the sensor (not illustrated) are not constant due to a diffraction phenomenon mentioned with reference to FIGS. 3B and 3C. When the quantities of lights illustrated in FIGS. 3D and 3E are used to determine reference light quantity, the determined reference light quantity is not reliable. Hereinafter, various embodiments of the image displayed on the patch 160 of the present general inventive concept will now be described.

The patch 160 of an embodiment of the present general inventive concept will be described in more detail with reference to FIGS. 4A-4F.

As described above, FIG. 4A illustrates another example of the image displayed on the patch 160 of an embodiment of the present general inventive concept. The patch 160 includes the previously established reference colors (for example, white and black) in a plurality of regions that are spaced a portion from each other. When one of the plurality of regions includes a boundary at a location on a predetermined axis (for example, an X axis) with regard to the patch 160, the plurality of regions may have the same color as that of a region including the boundary and include a region excluding the boundary at a location.

In more detail, the image displayed on the surface of the patch 160 illustrated in FIG. 4A includes a 4-1 image 410, a 4-2 image 420, and a 4-3 image 430. In this case, the scanning unit 170 separately scans the 4-1 image 410, the 4-2 image 420, and the 4-3 image 430.

FIG. 4B illustrates quantity of light detected by the sensor (not illustrated). A vertical axis represents the quantity of light reflected from the 4-1 image 410. An X axis represents a waveform 412 that is a location of the light reflected from the 4-1 image 410. FIG. 4C illustrates the quantity of light detected by the sensor (not illustrated). A vertical axis represents the quantity of light reflected from the 4-2 image 420. An X axis represents a waveform 422 that is a location of the light reflected from the 4-2 image 420. FIG. 4D illustrates the quantity of light detected by the sensor (not illustrated). A vertical axis represents the quantity of light reflected from the 4-3 image 430. An X axis represents a waveform 432 that is a location of the light reflected from the 4-3 image 430. Meanwhile, referring to FIGS. 4B through 4D, the quantity of light detected by the sensor (not illustrated) alternatively includes relatively high regions and relatively low regions. The quantity of light detected by the sensor (not illustrated), having relatively high regions, is the quantity of light reflected in a white region. The quantity of light detected by the sensor (not illustrated), having relatively low regions, represents the quantity of light reflected in a black region.

Referring to FIGS. 4B through 4D, quantities of light reflected in a white region differs according to whether the light is reflected in a portion (for example, a center portion) other than the boundary of the white region or the light is reflected in the boundary of the white region. Likewise, the quantities of light reflected in a black region differs according to whether the light is reflected in a portion (for example, a center portion) other than the boundary of the black region or the light is reflected in the boundary of the black region.

The waveforms 412, 422, and 432 cannot be rectangular pulse waveforms since the light reflected in the patch 160 is somewhat diffracted and reaches the sensor (not illustrated), is incident to the sensor (not illustrated), passes through a lens of the sensor (not illustrated), and somewhat spreads. For descriptive convenience, corners of pulse waveforms are referred to as curve portions, and the other portions are referred to as non-curve portions.

Referring to FIG. 4E, a waveform 440 represents a largest quantity of light among the quantities of lights illustrated in FIGS. 4B through 4D in each location on an X axis. In more detail, the waveform 440 represents the quantity of light reflected in a white region of the patch 160 in a vertical axis, and a location of the light reflected in the white region of the patch 160 in the X axis.

Referring to FIG. 4F, a waveform 450 represents a smallest quantity of light among the quantities of lights illustrated in FIGS. 4B through 4D in each location on an X axis. In more detail, the waveform 450 represents the quantity of light reflected in a black region of the patch 160 in a vertical axis, and a location of the light reflected in the white region of the patch 160 in the X axis.

The waveform 440 is a vertical waveform unlike the waveform 330 illustrated in FIG. 3D. Unlike the patch 160 illustrated in FIG. 3A, according to the patch 160 illustrated in FIG. 4E, the sensor (not illustrated) detects the quantity of light 424 of non-curve portions at a location on the X axis where the quantity of light 414 of curve portions is detected by the sensor (not illustrated).

The waveform 450 is a vertical waveform unlike the waveform 340 illustrated in FIG. 3E. Unlike the patch 160 illustrated in FIG. 3A, according to the patch 160 illustrated in FIG. 4F, the sensor (not illustrated) detects the quantity of light 434 of non-curve portions at a location on the X axis where the quantity of light 426 of curve portions is detected by the sensor (not illustrated).

When the quantities of lights illustrated in FIGS. 4E and 4F are used to determine reference light quantity, the determined reference light quantity can be always reliable.

The patch 160 of an embodiment of the present general inventive concept will be described in more detail with reference to FIGS. 5A-5H.

As described above, FIG. 5A illustrates another example of the image displayed on the patch 160 of an embodiment of the present general inventive concept. In more detail, the patch 160 is a generalized type of the patch 160 illustrated in FIG. 4A. Each of reference colors (for example, white and black) may be expressed in slant type regions of the patch 160. In this regard, the scanning unit 170 (FIG. 10) scans an image corresponding to each location on a Y axis in the image displayed in the patch 160, thereby scanning an entire image displayed on the patch 160. Each of images 510 through 550 corresponds to a location on the Y axis among the images displayed on the patch 160.

Figure 5A:
FIGS. 5A-5H are diagrams illustrating a patch according to another embodiment of the present general inventive concept.
Figure 5B:
Figure 5C:
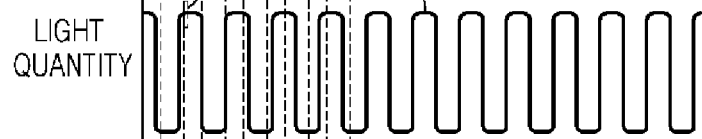
Figure 5D:
Figure 5E:
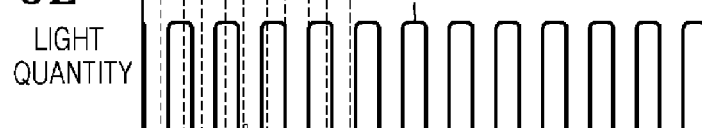
Figure 5F:
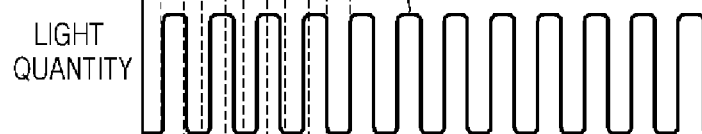

FIG. 5B illustrates the quantity of light detected by the sensor (not illustrated). A vertical axis represents the quantity of light reflected from the image 510. An X axis represents a waveform 512 that is a location of the light reflected from the image 510. FIG. 5C illustrates the quantity of light detected by the sensor (not illustrated). A vertical axis represents the quantity of light reflected from the image 520. An X axis represents a waveform 522 that is a location of the light reflected from the image 520. FIG. 5D illustrates the quantity of light detected by the sensor (not illustrated). A vertical axis represents the quantity of light reflected from the image 530. An X axis represents a waveform 532 that is a location of the light reflected from the image 530. FIG. 5E illustrates the quantity of light detected by the sensor (not illustrated). A vertical axis represents the quantity of light reflected from the image 540. An X axis represents a waveform 542 that is a location of the light reflected from the image 540. FIG. 5F illustrates the quantity of light detected by the sensor (not illustrated). A vertical axis represents the quantity of light reflected from the image 550. An X axis represents a waveform 552 that is a location of the light reflected from the image 550. Meanwhile, referring to FIGS. 5B through 5F, the quantity of light detected by the sensor (not illustrated) alternatively includes relatively high regions and relatively low regions. The quantity of light detected by the sensor (not illustrated), having relatively high regions, is the quantity of light reflected in a white region. The quantity of light detected by the sensor (not illustrated), having relatively low regions, represents the quantity of light reflected in a black region.

Referring to FIGS. 5B through 5F, the quantities of light reflected in a white region differs according to whether the light is reflected in a portion (for example, a center portion) other than the boundary of the white region or the light is reflected in the boundary of the white region. Likewise, the quantities of light reflected in a black region differ according to whether the light is reflected in a portion (for example, a center portion) other than the boundary of the black region or the light is reflected in the boundary of the black region.

The waveforms 512 through 552 cannot be rectangular pulse waveforms since the light reflected in the patch 160 is somewhat diffracted and reaches the sensor (not illustrated), is incident to the sensor (not illustrated), passes through a lens of the sensor (not illustrated), and somewhat spreads. For descriptive convenience, corners of pulse waveforms are referred to as curve portions, and the other portions are referred to as non-curve portions.

Figure 5G:
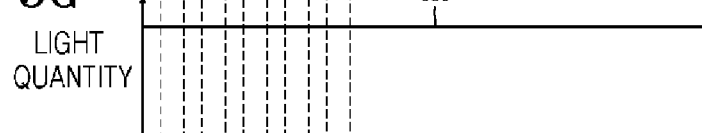

Referring to FIG. 5G, a waveform 560 represents a largest quantity of light among the quantities of lights illustrated in FIGS. 5B through 5F in each of locations on an X axis. In more detail, the waveform 560 represents the quantity of light reflected in a white region of the patch 160 in a vertical axis, and a location of the light reflected in the white region of the patch 160 in the X axis.

Figure 5H:
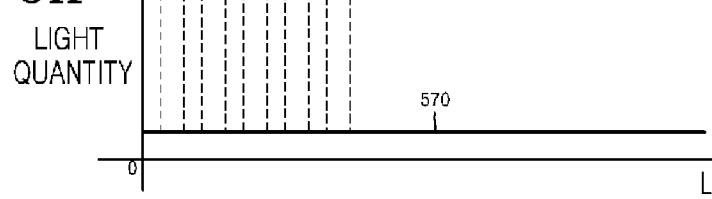

Referring to FIG. 5H, a waveform 570 represents a smallest quantity of light among the quantities of lights illustrated in FIGS. 5B through 5F in each location on an X axis. In more detail, the waveform 570 represents the quantity of light reflected in a black region of the patch 160 in a vertical axis, and a location of the light reflected in the white region of the patch 160 in the X axis.

The waveform 560 is a vertical waveform unlike the waveform 330 illustrated in FIG. 3D. Unlike the patch 160 illustrated in FIG. 3A, according to the patch 160 illustrated in FIG. 5A, the sensor (not illustrated) detects the quantity of light 524 of non-curve portions at a location on the X axis where the quantity of light 514 of curve portions is detected by the sensor (not illustrated).

The waveform 570 is a vertical waveform unlike the waveform 340 illustrated in FIG. 3E. Unlike the patch 160 illustrated in FIG. 3A, according to the patch 160 illustrated in FIG. 5A, the sensor (not illustrated) detects the quantity of light 544 of non-curve portions at a location on the X axis where the quantity of light 534 of curve portions is detected by the sensor (not illustrated).

When the quantities of lights illustrated in FIGS. 5G and 5H are used to determine the reference light quantity, the determined reference light quantity can be always reliable.

Alternatively, a unit patch is a basic unit that constitutes an entire region of the patch 160. The unit patch may be rectangular. The area of the unit patch may be a previously established value. The grid illustrated in FIG. 3A may be an example of the unit patch. Each of a first patch row through an $N^{th}$ patch row (N is a natural number) are unit patches arranged in one or more locations on the Y axis among the unit patches constituting the patch 160. Locations on the X axis are various unit patches. The 3-1 image 310 and the 3-2 image 320 illustrated in FIG. 3A are examples of a first patch row and a second patch row.

Figure 6:
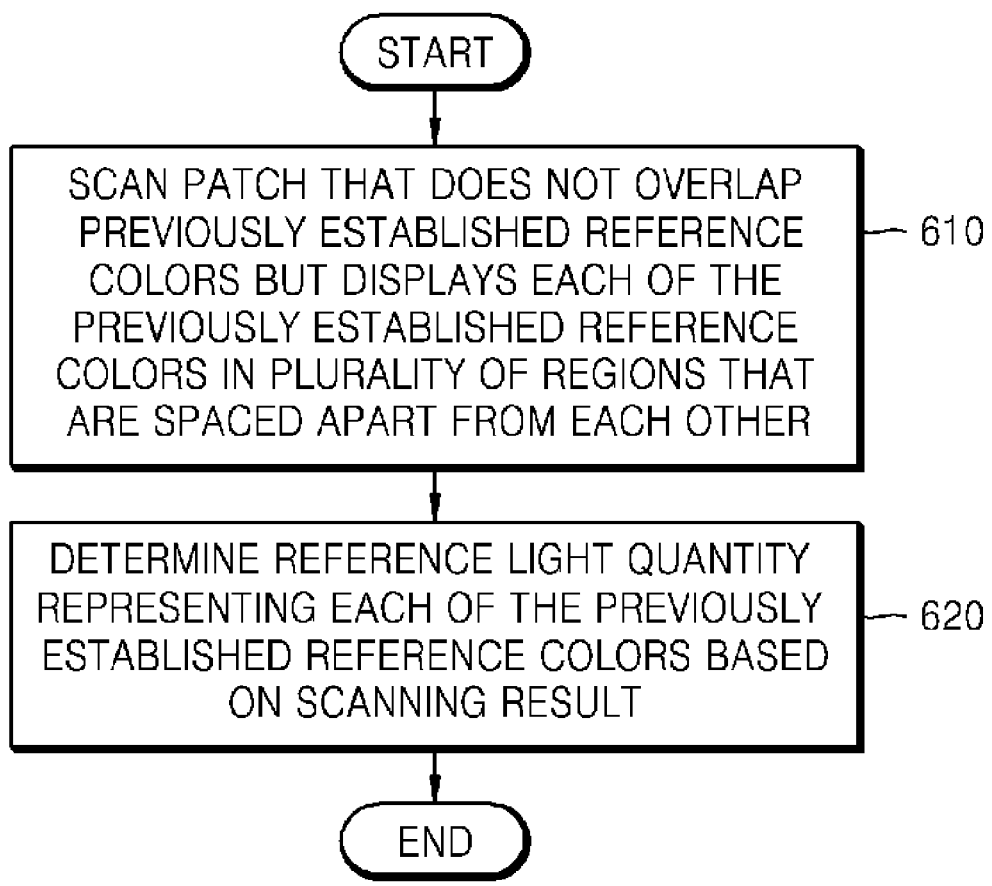
FIG. 6 is a flowchart illustrating a reference light quantity determining method according to an embodiment of the present general inventive concept.

FIG. 6 is a flowchart illustrating a reference light quantity determining method according to an embodiment of the present general inventive concept. The method will be described with reference to FIGS. 1A through 1D.

The scanning unit 170 scans the patch 160 that does not overlap previously established reference colors but displays each of the previously established reference colors in a plurality of regions that are spaced a portion from each other (Operation 610).

The reference light quantity determining unit 180 determines the reference light quantity representing each of the previously established reference colors based on the scanning result (Operation 620).

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The scanning apparatus and the reference light quantity determining method irradiate light on each point on the surface of a patch that does not overlap previously established reference colors but displays each of the previously established reference colors in a plurality of regions that are spaced a portion from each other, detect light reflected in each point, and determine reference light quantities based on the detected quantities of lights, thereby determining highly reliable reference light quantities.

Although various embodiments of the present general inventive concept have been illustrated and described, it will be appreciated by those skilled in the art that changes may be made in these embodiments without deportioning from the

What is claimed is:

1. An apparatus to scan a given document comprising:
a patch including a first patch row through an $N^{th}$ patch row each including a plurality of unit patches to correct a reference light quantity,
wherein the plurality of unit patches are repeatedly formed at a previously established interval and N is a natural number.

2. The apparatus of claim 1, wherein an optional unit patch of the first patch row and a unit patch of the $N^{th}$ patch row corresponding to the optional unit patch portionly overlap when the two unit patches penetrate an X axis in a lengthwise direction from an optional location of the first patch row.

3. The apparatus of claim 2, wherein quantities of the plurality of unit patches that overlap are constant.

4. A reference light quantity determining method used for an apparatus to scan a given document, the method comprising:
scanning a patch comprising a first patch row through an $N^{th}$ patch row each including a plurality of unit patches; and
determining reference light quantities based on the scanning result,
wherein N is a natural number.

5. The method of claim 4, wherein an optional unit patch of the first patch row and a unit patch of the $N^{th}$ patch row corresponding to the optional unit patch portionly overlap when the two unit patches penetrate an X axis in the lengthwise direction from an optional location of the first patch row.

6. The method of claim 5, wherein quantities of the plurality of unit patches that overlap are constant.

7. An image forming apparatus including an apparatus to scan a given document, the apparatus comprising:
a patch including a first patch row through an $N^{th}$ patch row each including a plurality of unit patches, wherein the patch is used to correct a reference light quantity,
wherein the plurality of unit patches are repeatedly formed at a previously established interval and N is a natural number.

8. The apparatus of claim 7, wherein an optional unit patch of the first patch row and a unit patch of the $N^{th}$ patch row corresponding to the optional unit patch portionly overlap when the two unit patches penetrate an X axis in a lengthwise direction from an optional location of the first patch row.

9. The apparatus of claim 8, wherein quantities of the plurality of unit patches that overlap are constant.

10. A scanning apparatus usable with an image forming apparatus, the scanning apparatus comprising:
a patch;
a light source to irradiate light on a plurality of points on a surface of the patch that does not overlap previously established reference colors;
a display to display each of the previously established reference colors in a plurality of regions that are spaced a portion from each other;
a sensor to detect light reflected in the plurality of points; and
a determining unit to determine reference light quantities based on the detected light.

11. A scanning apparatus usable with an image forming apparatus, the scanning apparatus comprising:
an input unit to receive an instruction signal to determine reference light quantities for a plurality of colors of a patch;
a determining unit to determine the reference light quantities for the plurality of colors of the patch at a plurality of time periods; and
a light source to irradiate light and to maintain a constant quantity of the irradiated light based on the determined reference light quantity at the plurality of time periods.

12. The scanning apparatus of claim 11, wherein the time periods comprise:
one or more of a period of time after a power-on state is activated and a period of time when a scan operation is completed for a predetermined number of sheets of documents.

13. A scanning method of an image forming apparatus, the scanning method comprising:
irradiating light on a plurality of points on a surface of the patch that does not overlap previously established reference colors;
displaying each of the previously established reference colors in a plurality of regions that are spaced a portion from each other;
detecting light reflected in the plurality of points; and
determining reference light quantities based on the detected light.

14. A scanning method of an image forming apparatus, the scanning method comprising:
receiving an instruction signal to determine reference light quantities for a plurality of colors of a patch;
determining the reference light quantities for the plurality of colors of the patch at a plurality of time periods; and
irradiating light and to maintaining a constant quantity of the irradiated light based on the determined reference light quantity at the plurality of time periods.

15. A non-transitory computer-readable recording medium having embodied thereon a computer program to execute a method, wherein the method comprises:
irradiating light on a plurality of points on a surface of the patch that does not overlap previously established reference colors;
displaying each of the previously established reference colors in a plurality of regions that are spaced a portion from each other;
detecting light reflected in the plurality of points; and
determining reference light quantities based on the detected light.

* * * * *